United States Patent [19]

Vandervoort

[11] Patent Number: 5,069,079
[45] Date of Patent: Dec. 3, 1991

[54] SELF-ENERGIZING SYNCHRONIZER

[75] Inventor: John R. Vandervoort, Richland, Mich.

[73] Assignee: Eaton Corporation, Cleveland, Ohio

[21] Appl. No.: 548,354

[22] Filed: Jul. 2, 1990

[51] Int. Cl.⁵ .............................................. F16H 3/38
[52] U.S. Cl. .................................... 74/339; 192/48.6; 192/53 H; 192/53 F
[58] Field of Search ................. 192/53 E, 53 F, 53 H, 192/53 R, 48.6; 74/339

[56] References Cited

U.S. PATENT DOCUMENTS

| | | | |
|---|---|---|---|
| 2,149,020 | 2/1939 | Hering | 74/339 |
| 2,540,232 | 2/1951 | Avila | 192/53 H |
| 2,908,367 | 10/1959 | Sinclair | 74/339 X |
| 2,986,249 | 5/1961 | Sinclair et al. | 74/339 X |
| 3,158,240 | 11/1964 | Harrington | 192/53 |
| 3,194,369 | 5/1963 | Witte | 192/45.1 |
| 3,333,663 | 8/1967 | Clements et al. | 192/53 H X |
| 3,358,800 | 12/1967 | Clements | 74/339 X |
| 3,978,949 | 9/1976 | Timtner | 192/41 A |
| 4,089,395 | 5/1978 | Fogelberg | 192/41 A |
| 4,141,440 | 2/1979 | Richards | 74/339 X |
| 4,373,620 | 2/1983 | Zlotek | 192/41 A |
| 4,756,395 | 7/1988 | Zlotek | 192/41 A |
| 4,796,741 | 1/1989 | Loeffler | 192/53 E |

FOREIGN PATENT DOCUMENTS 0278644 8/1988 European Pat. Off. .
0543352 6/1922 France .............................. 192/53 H Primary Examiner—Allan D. Herrmann
Assistant Examiner—Daniel Wittels
Attorney, Agent, or Firm—R. A. Johnston

[57] ABSTRACT

A synchronizer of the pin type employing a friction cone on the gear to be engaged. The synchronizing ring employs pins positively drivingly engaging an axially movable dogged shifting clutch splined to the output shaft and axially engageable with the gear to be engaged. In one embodiment, the synchronizer ring has a plurality of sprag members circumferentially spaced about the ring and pivoted thereon with the radially outer surface thereof tapered to frictionally engage the friction cone upon axial force application to the ring by the shifting clutch. In another embodiment the synchronizer ring has a plurality of sprag members circumferentially spaced within the ring and pivoted thereon with the radially inner surface thereon tapered to frictionally engage the friction cone upon axial force application to the ring by the shifting clutch. In both embodiments, the sprag members are pivoted by the camming action to increase the friction forces and effect synchronization without increase in the axial force applied to the ring.

9 Claims, 2 Drawing Sheets

SELF-ENERGIZING SYNCHRONIZER

BACKGROUND OF THE INVENTION

The present invention relates to ring and pin type cone synchronizers employed for matching the speed of rotation of drive elements employed in a power transmission and particularly relates to changeable ratio power transmissions employed in vehicle drive trains. The synchronizer of the present invention is particularly applicable to heavy duty transmissions for trucks and off-highway vehicles where the axial force required to activate synchronization of the power elements to be engaged, is relatively high. This condition arises particularly in heavy duty truck transmissions where the cone angle of the annular tapered synchronizing surface is a relatively small angle and a substantial wedging effect is created due to the low cone angle of the synchronizing surfaces. The aforesaid wedging affect, although producing a mechanical advantage for actuation of the synchronizer for matching the relative speeds of rotation of the members during engagement, often results in axial locking of the synchronizer ring in such a manner as to prevent unblocking of the sliding clutch which further prevents axial movement when it is desired to move along the synchronizer pins and complete engagement of the power driving elements.

It has thus long been desired to find a way or means of providing for low force synchronization of relative rotation of power drive elements in a power transmission for ease of engagement during ratio change yet to prevent jamming or lockup of the synchronizer which makes it difficult to complete engagement after synchronization has been completed.

SUMMARY OF THE INVENTION

The present invention provides a ring and pin cone type synchronizer having self-energizing action for use in providing synchronization of drive elements during ratio changes in a power transmission. The present invention utilizes a synchronizer ring for frictionally engaging a relatively low angle cone synchronizing surface on a drive member to be engaged and employs axially extending pins thereabout for engaging a sliding clutch member for providing the axial force on the synchronizer ring to effect frictional speed synchronization of the relatively rotatable power driving elements prior to positive driving engagement with the clutch member.

The synchronizer ring of the present invention has a plurality of sprag members pivotally mounted thereon in circumferentially spaced engagement. Each of the sprag members has the one outer surface thereof axially tapered to match the taper of the friction cone surface on the drive member. The sprag members are each pivotable on the ring such that upon axial movement of the ring frictional engagement of the sprag members occurs when contacting the friction cone surface. When one power element is overrunning the other, the sprag members are pivoted by the tangential frictional forces of the cone acting thereon to be cammed on the synchronizer ring, for thereby increasing the frictional forces. Upon overrunning of the other of the said power driver elements with respect to the said one element, the sprag members are pivoted to prevent such camming action and permit slippage to occur, thus unlocking the synchronization. The pivoting of the sprag members for the camming action thus provides a self-energizing action to the synchronizing ring.

The present invention thus provides a self-energizing synchronizer employing pivotal sprag members on the synchronizer ring for facilitating synchronization and release thereof upon reaching synchronization.

In another embodiment, the sprags are symetric to effect camming in either case of overrunning to give self-energizing both conditions, i.e., when one drive element overruns the other.

DETAILED DESCRIPTION

Figure 1:
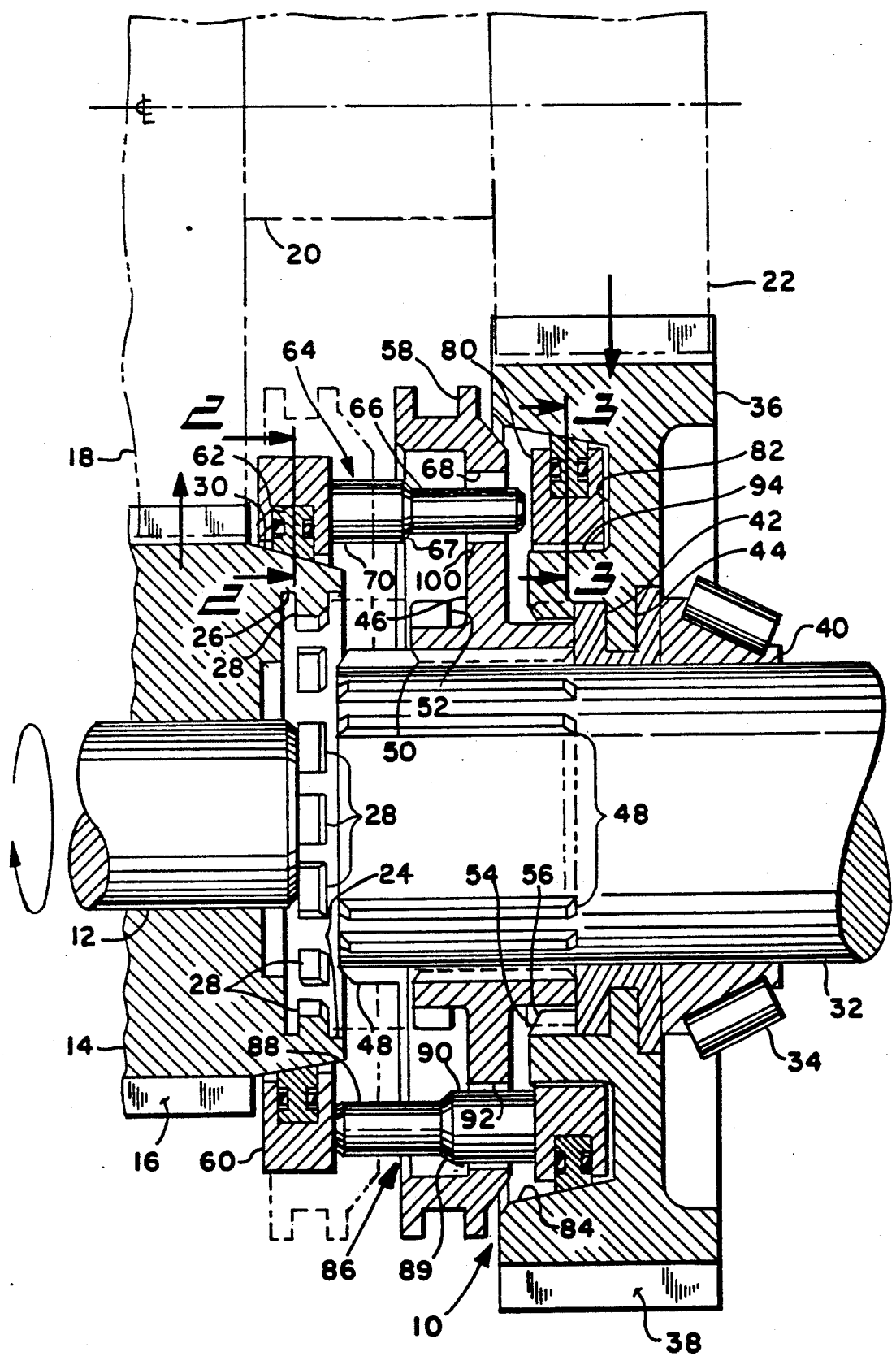
FIG. 1 is a cross-sectional view taken through the axis of rotation of the synchronizer of the present invention as employed in a vehicle power transmission.

Referring to FIG. 1, the synchronizing assembly of the present invention is indicated generally at 10 and is typically employed in a heavy duty transmission for a vehicle power train wherein an input shaft 12 has drivingly attached thereto an input gear 14 having the outer periphery thereof provided with a plurality of teeth 16 which are adapted for drivingly engaging countershaft gear 18, indicated in dashed outline in FIG. 1, for driving a countershaft 20, indicated in dashed outline, which has attached thereto a second countershaft gear 22 also indicated in dashed outline.

Input gear 14 also has on the free axial end thereof adjacent the end of shaft 12 a counterbore 24 having disposed about the circumference thereof a plurality of spaced radially inwardly extending lugs or teeth 28. Input gear 14 also has disposed on the outer periphery thereof and axially adjacent the teeth 16 a conically tapered surface 30 adapted for frictional engagement therewith. It will be understood that shaft 12 is suitably journalled on the gear case or housing (not shown) in a manner well known in the art.

An output shaft or mainshaft 32 is disposed axially coincident and spaced from shaft 12; and, is suitably journalled for rotation on the gear casing or housing (not shown) as for example by a tapered roller bearing having a plurality of rollers 34 adapted for engaging an outer race (not shown) provided on the housing. Shaft 32 has an output gear 36 received concentrically thereover and having a plurality of teeth 38 provided about the outer periphery thereof adapted for receiving power from the countershaft gear 22. Output gear 36 is journalled for rotation in a bearing race 40 attached to the surface of shaft 32 by means of a radially inwardly extending flange 44 provided on gear 36 which secures the gear in the desired axial location on the shaft 32.

An annular dog clutch member 46 is slidably received over the shaft 32 and engages the shaft by means of a plurality of splines 48 disposed about the circumference of the shaft 32 and which are engaged by complementary splines 50 provided on the inner periphery of the dog clutch 46. The clutch 46 has a first row of circumferentially spaced dogs or teeth 52 provided at one axial end thereof. Upon sliding movement of the clutch 46, from the position shown in solid outline in FIG. 1 leftward to the position shown in dashed outline, the teeth 52 engage the dogs or teeth 28 provided on the input gear 14 for power transmission therebetween.

The clutch 46 has a second row of circumferentially spaced dogs or teeth 54 provided thereon and disposed at the axial end opposite dogs 52 and which, in the position shown in solid outline in FIG. 1, engage a complementary set of circumferentially spaced internal teeth 56 provided about output gear 36. It will be understood that with clutch member 46 in the position shown in solid outline in FIG. 1 that power is transmitted from input gear 14 through countershaft gear 18 shaft 20 and countershaft gear 22 to output gear 36 which is drivingly engaged to the shaft 32 by virtue of engagement of the dogs or teeth 54,56.

Clutch member 46 has a circumferental groove 58 provided about the outer periphery thereof which is adapted for receiving therein a clutch fork (not shown) for effecting user selected axial movement of the member 46 between the position shown in the solid and dashed outlines in FIG. 1 as is well known in the art.

A first annular synchronizing ring 60 is provided concentrically over the friction cone surface 30. The ring 60 has a circumferential groove 62 provided about the inner periphery thereof. A plurality, preferably three, circumferentially spaced pins are provided about the axial face of ring 60 one of which is illustrated and denoted generally by reference numeral 64 in FIG. 1. Each of the pins 64 has a reduced diameter or pilot portion 66 which extends through a corresponding substantially larger diameter aperture 68 provided in the clutch member 46. The root portion of each of the pins 64 is formed to a larger diameter 70 which is a close sliding fit with the aperture 68 when the clutch 46 is moved fully to the engaged position shown in dashed outline in FIG. 1. As is well known in the art, as clutch 46 is moved from the position shown in solid outline in FIG. 1 axially toward the position shown in dashed outline, the step 67 intermediate the pilot diameter 66 and the larger diameter 70 engages a corresponding surface 100 provided at aperture 68 on the side thereof to thereby provide axial force to move the ring 60 in a leftward direction with respect to FIG. 1.

Figure 2:
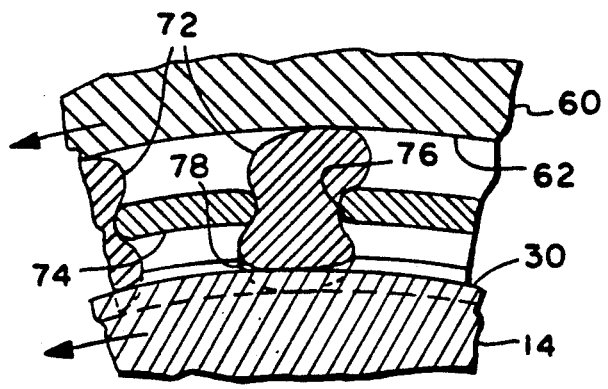
FIG. 2 is a section view taken along section-indicating lines 2—2 of FIG. 1.

Referring to FIGS. 1 and 2, synchronizer ring 60 has a plurality of pivotally movable sprag members 72 disposed in circumferentially spaced arrangement about the groove 62 and retained in such spaced arrangement by an annular cage ring or spacer element 74, with each sprag 72 received through an aperture 76 provided in the cage. The radially inner surface of each of the sprags of FIG. 2 is tapered at an angle corresponding to the cone angle of surface 30. Upon movement of the ring 60 in a direction to cause frictional contact between the tapered surface 78 of the sprags with the cone surface 30 or leftward with respect to the illustration of FIG. 1, the surface 78 is subject to tangential friction forces which cause counterclockwise pivotal movement of the sprag 72 and a camming or wedging action of the sprags between the cone surface 30 and the surface of groove 62. It will be understood that this action occurs when the clutch 46 has the aperture 68 thereof engaging the step in the blocker pin 64 so as to provide the axial force on ring 60 for causing frictional engagement of the sprag member 72 with cone surface 30.

Referring to FIG. 2, with the synchronizer ring 60 and output gear 14 rotating in a counterclockwise direction a camming action of the sprag member 72 would occur when the ring 60 is overrunning the input gear 14. Upon the friction forces of the groove 62 acting on the radially outer end of the sprag member 72 effecting synchronization of the rotational speed of ring 60, and consequently the clutch 46 and shaft 32, with the rotational speed of input gear 14, the tangential forces of aperture 68 acting against blocker pin 64 are relaxed. The clutch 46 is then moved axially to the position shown in dashed outline in FIG. 1 engaging the clutch dogs 52 with the dogs 28 on the input gear thereby relaxing the frictional forces on the sprag member 72 and permitting release of the camming action thereof.

In the event that the shaft 14 is overrunning the ring 60, the sprag members are pivoted in a clockwise direction about the aperture 76 upon axial movement of the ring 60 to bring the surfaces 78 in contact with friction cone 30; and, a camming action of the sprag members does not occur because of the configuration of the radially inner and radially outer ends of the sprag member 72 as shown in FIG. 2. Therefore, the arrangement of the sprag members of the embodiment of FIG. 2 is considered to be a "one way" synchronizer.

Referring to FIG. 2, a second annular synchronizer ring 80 is provided and is received in an annular groove 82 provided in the axial face of gear 36. The outer periphery of groove 82 has a conical friction surface 84 formed thereon. The second synchronizer ring 80 is nested in groove 82 in free sliding arrangement and has a plurality, preferably three, of pins indicated generally at 86 spaced circumferentially thereabout and extending axially from the lefthand axial face of ring 80 as illustrated in FIG. 1. Each of the three pins 86 has a lesser diameter portion 88 at the outer end thereof; and, the root portion 90 is formed of a larger diameter which can enter a corresponding aperture 92 provided in clutch 46 in free sliding engagement. Each of the pins 86 has a chamfered step 89 intermediate the diameters 88,90.

Figure 3:
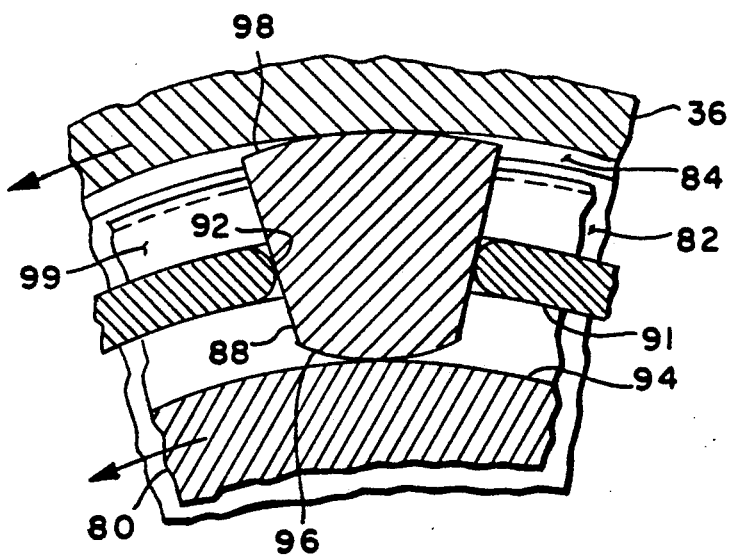
FIG. 3 is a section view similar to FIG. 2 of an alternate embodiment of the invention taken along section-indicating lines 3—3 of FIG. 1.

Referring to FIGS. 1 and 3, synchronizer ring 80 has a circumferential groove 99 formed in the outer periphery thereof. The groove 99 has received therein a plurality of two-way sprag members 88 disposed in circumferentially spaced arrangement in the groove 99 and spaced therein by suitable cage ring 91 having apertures 92 formed therein with the edges of the aperture 92 providing pivot surfaces for the sprag member 88. The groove 99 has the radially inner wall thereof formed as generally a right cylindrical surface 94 with the radially inner surface 96 of the sprag member curved to a smaller radius than the radially outer surface 98 of the sprag member.

In operation, relative counterclockwise rotation of the output gear 36 at a rate faster than the ring 80 causes counterclockwise rotation of sprag member 88 and camming of the sprag member to frictionally engage the friction cone 84. Similarly, relative counterclockwise rotation of the ring 80 at a rate faster than the output gear 36 causes clockwise rotation of the sprag member 88 and camming of the surface 96 against the edge 94 of the groove and the surface 98 against the friction cone 84 to effect synchronization. It will be understood that upon the gear 36 reaching synchronous speed with ring 80, camming action of the sprag member 88 relaxed upon release of the axial force from the shifting clutch 46. Although the alternative two-way sprag members 88 have been shown as embodied in FIG. 3, for ring 80 it will be understood that the one-way sprag members of FIG. 2 may be employed instead for the synchronizer ring 80.

The present invention thus provides a unique and novel synchronizing assembly for facilitating gear ratio changes in a power transmission and employs a plurality of circumferentially spaced pivotally movable sprag members disposed about the synchronizer ring for providing a positive camming action between the synchronizer ring and the friction cone surface on the power transmission element to be synchronized. The sprag members of the present invention provide increased tangential frictional forces with minimum axial force to facilitate synchronization and to thereby prevent wedging of the synchronizer ring and the friction cone for low angle friction cones.

Although the invention has hereinabove been described with respect to the illustrated embodiments, it will be understood that the invention is capable of modification and variation and is limited only by the following claims:

I claim:

1. In synchronized gear shifting in a power transmission, the improvement comprising:
  (a) housing means;
  (b) input shaft means journalled for rotation on said housing means and adapted for receiving torque thereon;
  (c) output shaft means journalled for rotation on said housing means independently of and about an axis coincident with the axis of rotation of said input shaft means and adapted for transmitting torque therefrom;
  (d) clutch means mounted for fixed rotation with and axial movement on one of said input and output shaft means, said clutch means having a first and second set of axially spaced peripheral teeth thereabout, said clutch means adapted for being axially moved by a shifting fork;
  (e) output gear means mounted for rotation with said output shaft means, said output gear means having a set of teeth engageable with said second set of clutch means peripheral teeth, said output gear means also having provided thereon an annular tapered friction surface;
  (f) said input shaft means having a set of teeth engageable with said first set of clutch means peripheral teeth and having provided thereon an annular tapered friction surface;
  (g) said clutch means defining engagement surfaces thereon adapted for engaging a synchronizing ring;
  (h) a first annular synchronizing means including means defining friction surfaces complementary to said input shaft means annular tapered surface, said first synchronizing member defining surfaces thereon engaging said clutch means engaging surfaces in a tangential direction and permitting axial sliding movement therebetween, said means defining said friction surfaces including a plurality of circumferentially spaced sprag members pivotally movable to effect frictional synchronizing of said annular member with said input shaft means annular tapered surface upon one of said input shaft means and said synchronizing means overrunning the other, and operable to effect release of frictional synchronizing upon the other overrunning said one, wherein said clutch means is operable upon user movement from a first to a second axial position to effect synchronization and engagement of said clutch means and said input gear means;
  (i) a second annular synchronizing means including means defining friction surfaces complementary to said output gear means annular tapered surface and including a plurality of circumferentially spaced sprag members pivotally movable to effect self-energizing frictional synchronization of said second synchronizing means with said output gear means upon operator axial movement of said second synchronizer means when said output shaft means overruns said output gear means, said sprag members are pivotally moved to release said frictional synchronization when said output gear means overruns said output shaft means.

2. In a changeable gear power transmission having a pin-type cone synchronizer for matching gear and shaft speeds for facilitating gear engagement during drive ratio changes to a shaft the improvement comprising:
  (a) synchronizer ring means defining an annular friction surface concentric with the shaft, said synchronizer means having a plurality of circumferentially spaced generally axially extending pin means thereon, said pin means adapted for engaging axially movable clutch means, rotating with said output shaft;
  (b) gear means received over said output shaft and freely rotatable with respect thereto and adapted for being engaged by an axially movable clutch, said gear means defining thereon a conical synchronizing surface;
  (c) a plurality of sprag members mounted on said synchronizer ring means for pivotal movement with respect thereto, said sprag members upon overrunning, in a given direction of rotation, of said output shaft and said ring means with respect to said output gear means operable to pivot and frictionally engage said conical synchronizing surface and said annular surface for preventing relative rotation of output gear with respect to said ring means, and upon overrunning of said output gear with respect to said output shaft, said sprag members are pivotally moved to permit slippage.

3. The transmission defined in claim 2, wherein each of said sprag members has the radially outer surface thereof configured with a taper complementary to said conical synchronizing surface.

4. The transmission defined in claim 2, wherein each of said sprag members has the radially inner surface thereof configured complementary to said annular friction surface.

5. A self-energizing synchronizer for facilitating engaging of gears to a shaft in a changeable ratio power transmission comprising:
  (a) a torque transmitting shaft with shifting clutch means thereon axially movable between an engaged and disengaged position, said clutch means having axially engageable driving teeth means thereon, said clutch means coupled to said shaft for rotation therewith;
  (b) drive gear means journalled for concentric rotation with respect to said shaft means and defining a conical synchronizing friction surface thereon, said drive gear means having teeth means thereon axially engageable with said clutch teeth means;
  (c) synchronizing ring means carried by said clutch means and upon application of an axial shifting force thereto axially movable for frictionally contacting said conical surface and effecting rotational speed synchronization between said clutch means and said gear means to thereby permit movement of said clutch means to said engaged position, said ring means having disposed thereon a plurality of circumferentially spaced sprag members pivotally movable on said ring means, whereupon said axial movement of said ring means said sprag members make frictional contact with said conical surface on said gear means and the tangential forces of said frictional contact effect pivotal movement of said sprag members in a direction increasing said frictional forces for effecting self-energizing synchronization so long as a substantial rotational speed difference and said axial shifting force is maintained, and upon synchronization and release of said axial shifting force, said sprag members are pivotable to a released position.

6. The synchronizer defined in claim 5, wherein each of said sprag means is configured such that said self-energization pivotal movement occurs only when said gear means is overrunning said shaft means.

7. The synchronizer defined in claim 5, wherein each of said sprag means is configured such that said self-energization pivotal movement occurs when one of said gear means and said shaft means is overrunning the other.

8. The synchronizer defined in claim 5, wherein each of said sprag members has the outer surface thereof conically tapered complementary to said conical synchronizing surface and said outer tapered surface and the radially inner surface of said sprag members each have the central region thereof curved at a first radius and the margins thereof curved at a second radius greater than said first radius.

9. The synchronizer defined in claim 5, wherein said ring means defines a generally cylindrical surface disposed for camming contact with the radially inner surface of each of said sprag members.

* * * * *